United States Patent [19]

Kurpanek

[11] 3,786,385
[45] Jan. 15, 1974

[54] MAGNETO-MOTIVE BISTABLE SWITCHING DEVICES

[76] Inventor: Waldemar Helmut Kurpanek, Mercator Str. 3, Dusseldorf, Germany

[22] Filed: July 21, 1972

[21] Appl. No.: 273,941

Related U.S. Application Data

[63] Continuation-in-part of Ser. Nos. 149,174, June 2, 1971, abandoned, and Ser. No. 273,940, July 21, 1972.

[52] U.S. Cl. .............................................. 335/207
[51] Int. Cl. .......................................... H01h 19/60
[58] Field of Search ................... 335/205, 206, 207

[56] References Cited
UNITED STATES PATENTS
3,418,610   12/1968   Hammond .......................... 335/205
3,579,159   5/1971   Posey ................................. 335/205

*Primary Examiner*—Roy N. Envall, Jr.
*Attorney*—John C. Holman et al.

[57] ABSTRACT

A manually operable magneto-motive bistable manual switch comprising a hermetically sealed contact container space having at least one pair of stationary contact points and one free floating ferro-magnetic contactor. The contact container and associated components are mounted rigidly within the magnetic flux fields of two rigidly mounted permanent magnets spaced apart so that unlike poles of each magnet face each other across a given distance. A rotatable keeper is disposed in said switch to form with the magnets two closed ring flux fields. By rotating the keeper into the magnetic ring flux field of one permanent magnet the permanent magnet's magnetic flux field becomes directly shorted and thus the ferro-magnetic free floating contactor is attracted by the other permanent magnet to execute bistable switching operation within the contact container by establishing a bridging relationship between at least one pair of the stationary contact points.

7 Claims, 2 Drawing Figures

3,786,385

MAGNETO-MOTIVE BISTABLE SWITCHING DEVICES

PRIOR APPLICATIONS

This is a continuation-in-part application of U.S. Pat. applications Ser. Nos. 149,174 filed June 2, 1971 now abandoned and 273,940 filed July 21, 1972 which incorporates by reference the disclosures thereof into the instant application.

BACKGROUND OF THE INVENTION

This invention is directed to the production of a magneto-motive bistable manual switch having many advantages over prior art devices such as simple but effective design, increased ease of manufacture and durability and constant switching characteristics.

SUMMARY OF THE INVENTION

This object is attained due to the construction of a free floating ferro-magnetic contactor disposed within a magnetically and electrically non-conductive contact container composed of, for example, glass, and having at least one pair of contact points. The contact container is rigidly mounted parallel between two rigidly mounted bridge type permanent magnets of high retentivity, such as cobalt rare-earth type, the magents facing each other so that unlike poles of one magnet face unlike poles of the other thus forming two magnetic ring flux fields. A ferro-magnetic keeper is rigidly connected to an exteriorly mounted switch knob so that by manually turning the switch knob the keeper rotates between the magnetic ring flux fields lengthwise around the contact container, thereby shorting one magnetic ring flux field of one permanent magnet whilst the ring flux field of the other permanent magnet attracts the free floating ferro-magnetic contactor due to the magnetic force of attraction therebetween. Hence a bistable switching operation is carried out within the contact container by establishing a bridging relationship between at least one pair of AC or DC contact points. Each contact point is electrically connectible exteriorly on the switch housing by clamp screw terminals such as binding screws.

The function of the switch is fully directionally independent due to the high magnetic force of attraction of the permanent magnets ring flux fields. The switch although manually operated executes the switching operations by remote control due to the direct shorting effect of the magnetic ring flux fields of the magnets the ferro-magnetic keeper is rotated. The switch is absolutely fireproof due to its hermetically sealed contact container.

BRIEF DESCRIPTION OF THE DRAWINGS

The invention will become more apparent from a detailed description of a preferred embodiment taken with reference to the drawings wherein.

DETAILED DESCRIPTION OF A PREFERRED EMBODIMENT

Figure 1:
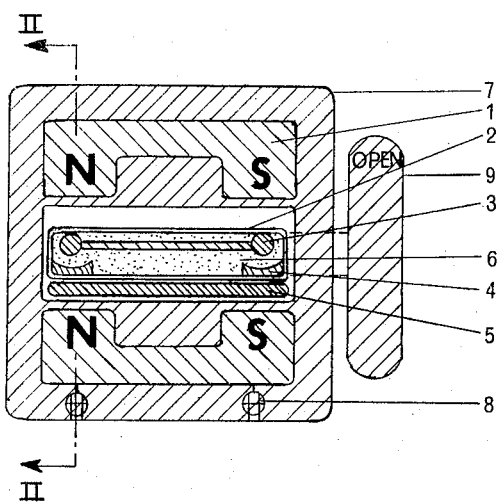
FIG. 1 shows a cross-sectional view of the switch according to the present invention.
Figure 2:
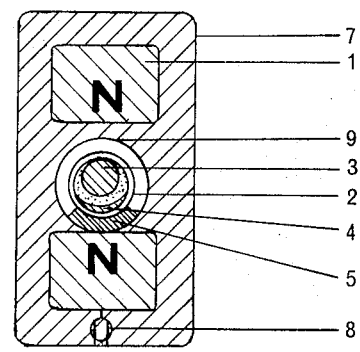
FIG. 2 shows a cross-sectional view of the switch according to the present invention taken along the line II—II of FIG. 1.

The manually operable magnetic-motive bistable switch according to the invention and as illustrated in FIGS. 1 and 2 of the drawing comprises two bridge type permanent magnets 1 mounted rigidly within the switch housing 7 of the switch, and spaced apart so that opposing magnetic poles of each magnet face each other at a given distance thus forming with the application of a ferro-magnetic keeper 5 two ring flux fields. A hermetically sealed electrically and magnetically non-conductive contact container 2 disposed within the switch has at least one pair of electrical contact points 4 spaced apart and mounted on the end portions of the interior wall surface of the contact container 2 each contact point 4 being electrically connectable exteriorly of the switch housing 7 by clamp screw terminals 8 embodying binding screws. The contact container 2 has a free floating ferro-magnetic contactor 3 for the purpose of establishing bridging relationships between the contact points 4 disposed within the contact container 2 the contactor 3 being mounted rigidly parallel between the two permanent magnets and having an electrically conducting surface coating. The rotable ferro-magnetic keeper 5 is connected to an exteriorly mounted rotable control switch knob 9 which rotates by a manual turn of the switch knob 9 lengthwise half way around the vertical axis of the contact container 2. The keeper 5 thus enters the ring flux field of one respective permanent magnet thereby directly shortening the magnetic ring flux field whereupon the ferro-magnetic contactor becomes magnetically attracted by the ring flux field of the other respective permanent magnet. Hence the ferro-magnetic contactor 3 establishes the respective bistable switching operation by establishing a bridging relationship between at least one pair of the electrical contact points 4 within the contact container 2. By manually turning the control switching knob 9 in the opposite direction the bistable switching operation is reversed.

The switch functions fully directionally independent due to the high force of magnetic attraction of the magnetic ring flux fields of the permanent magnets 1. To switch high AC or DC currents an arc extinguishing medium 6 and a contactor 3 having spherical end-contact surfaces to reduce high voltage arcing are disposed in the contact container 2.

What is claimed is:

1. A manually operable magneto-motive bistable switch having a switch housing and comprising:

means for rigidly mounting at least two permanent magnets within said switch housing so that the poles of one magnet face the poles of the other at a given distance therebetween, said facing poles having opposite magnetic polarity; a rotatable ferro-magnetic keeper means disposed in said switch housing so that said keeper means with said permanent magnets, forms two closed magnetic ring flux fields;

contact container means disposed in said switch housing said container means being hermetically sealed and electrically and magnetically non-conductive said contact container means having an interior and exterior wall surface and at least one pair of electrical contact points spaced apart and mounted on the end-portions of said interior wall surface of the said contact container means each of said contact points being electrically connectable exteriorly of said contact container means to render possible electrical connection with said switch;

electrically conductive free floating ferro-magnetic contactor means disposed within said hermetically sealed contact container means;

control knob means rotationally disposed exteriorly of said switch housing and rigidly connected to said rotatable ferro-magnetic keeper means so that said keeper means rotates between said magnetic ring flux fields of said permanent magnets when a rotatable force is applied to said control knob means, said keeper means thereby directly shorting one ring flux field of one of said permanent magnets, while the ring flux field of the other one of said permanent magnets magnetically attracts said ferromagnetic contactor whereby said contactor means executes a bistable switching operation of said switch by establishing a bridging relationship between at least one pair of said electrical contact points.

2. A manual switch as defined in claim 1 wherein said at least two permanent magnets are of the cobalt-rare earth type.

3. A manual switch as defined in claim 1 wherein an arc extinguishing medium is disposed within said hermetically sealed contact container means.

4. A manual switch as defined in claim 1 wherein said switch housing is composed of a magnetically and electrically non-conductive material such as plastic.

5. A manual switch as defined in claim 1 wherein said hermetically sealed contact container means is composed of a magnetically and electrically non-conductive material such as glass.

6. A manual switch as defined in claim 1 wherein said floating ferro-magnetic contactor means has an electrically conductive surface coating.

7. A manual switch as defined in claim 1 wherein said contactor means has spherical end-contact surfaces to reduce high voltage arcing.

* * * * *